United States Patent Office 3,062,877
Patented Nov. 6, 1962

3,062,877
PRODUCTION OF 3,5,6-TRICHLOROSALICYLIC ACID
Delbert L. Hanna, Oak Park, Ill., assignor to Velsicol Chemical Corporation, Chicago, Ill., a corporation of Illinois
No Drawing. Filed Nov. 2, 1959, Ser. No. 850,109
8 Claims. (Cl. 260—521)

This invention relates to the production of 3,5,6-trichlorosalicylic acid. In particular, this invention relates to the catalytic chlorination of 3,5-dichlorosalicylic acid.

Various procedures have been set forth in the literature for the production of 3,5,6-trichlorosalicylic acid. None of the presently known methods are satisfactory in that they fail to produce high yields of product in commercially practical reaction times and with the use of minimum amounts of reactants and solvents.

It is, therefore, an object of the present invention to devise a process for the production of 3,5,6-trichlorosalicylic acid in high yields and minimum reaction time.

Another object of the present invention is to prepare 3,5,6-trichlorosalicylic acid by a process using a minimum quantity of reactants and solvents.

Another object of the present invention is the creation of a process for the production of 3,5,6-trichlorosalicylic acid which minimizes the formation of undesired by-products such as isomers and polymers.

Still another object of the present invention is to devise a process whereby 3,5,6-trichlorosalicylic acid is formed and recovered without substantial anhydride formation.

Other objects of the present invention will become apparent from the ensuing description.

Unexpectably, it has been found that 3,5,6-trichlorosalicylic acid can be prepared in high yield and in the absence of consequential by-product formation by the reaction of 3,5-dichlorosalicylic acid and chlorine in the presence of critical amounts of iodine and in the presence of fuming sulfuric acid. The effect of the relatively minor amounts of iodine catalysts is particularly surprising, since the use of too high a concentration prevents formation and recovery of the desired product.

Accordingly, the present process must be performed using from about 0.0001 to about 1.0 percent by weight iodine of the 3,5-dichlorosalicylic acid and optimum results are obtained by maintaining an iodine concentration from about 0.005 to about 0.1 weight percent. When using amounts lower than and higher than the specified amounts of iodine, the product yield decreases at a substantial rate, while when operating within the specified ranges, yields of 90 percent and higher are readily obtained. By using the preferred range, the high yields are insured. In performing the present process it is necessary to conduct it using fuming sulfuric acid solvent. In the absence of the fuming sulfuric acid 3,5,6-trichlorosalicylic acid is not obtained in substantial amounts. Further, in order to obtain the maximum amount of acid rather than the anhydride, it is necessary to perform the reaction in sufficient fuming sulfuric acid, such that there is present approximately a minimum of 4 moles of sulfur trioxide per mol of 3,5-dichlorosalicylic acid. The use of excessive amounts of fuming sulfuric acid is not appreciably beneficial and can cause operation difficulties. Thus, for practical purposes, when preparing the acid, the concentration of fuming sulfuric acid should be maintained between about 4 and 8 moles of $SO_3$ per mol of 3,5-dichlorosalicylic acid. When using less than this amount, there will be formed varying amounts of the anhydride depending on the amount of $SO_3$ present.

When operating the present process it is proposed to maintain the temperature within a narrow range. When operating under atmospheric pressure the temperature should be held below about 100° C. due to boiling of the reaction mixture. Likewise, the temperature should be kept above about 40° C. so as to prevent precipitation of product. In order to obtain optimum yields of product, the temperature should be kept between about 60° C. and 80° C.

When operating this process, unlike the known processes for manufacturing 3,5,6-trichlorosalicylic acid, the reaction time to produce 90 percent and higher yields is relatively short. While the precise time necessary to obtain high yields will vary with the temperature, pressure, equipment, and other operating variables, the reaction time is between about one and three hours; usually, two to three hours. Added reaction time is unnecessary.

Since chlorine is normally used in a gaseous form the use of superatmospheric pressures up to 200 lbs. per square inch can be of advantage in improving contact of the reactants. When using higher pressures, the temperature should be maintained somewhat below the boiling point of the reaction mixture.

The present process can be performed as a batch or as a continuous process depending on the economics involved. One common method operable is to heat a body containing 3,5-dichlorosalicylic acid, fuming sulfuric acid, and iodine in the necessary proportions and passing gaseous chlorine therethrough.

Other procedures known to the art for such reactions can also be used such as the use of two continuously flowing counter current streams, one of chlorine and the other containing the remaining components.

While various methods of recovering the product can be practiced, a particularly desirable procedure is to rapidly cool the reaction mixture by quenching, followed by filtration to obtain 3,5,6-trichlorosalicylic acid. Additional purification can be performed if the end use of 3,5,6-trichlorosalicylic acid requires it.

The following examples illustrate the operation of the present process which is not to be construed as limited thereto. In the examples, all weight percents are based on the weight of the 3,5-dichlorosalicylic acid.

*Example I*

3,5-dichlorosalicylic acid (120 g.), 65 percent fuming sulfuric acid (150 ml.) and iodine (.0062 weight percent; 0.007 g.) were placed in a 500 ml. 3-necked flask equipped with stirrer, thermometer, chlorine inlet and vent, and the reaction mixture was heated to about 70° C. Chlorine gas was bubbled through the reaction mixture with continuous stirring at a constant rate of about 120 g. per hour. Throughout the two hour reaction time, the temperature was maintained at 70° C. At the conclusion of the reaction time the reaction mixture was poured slowly into 1500 ml. of cold water, filtered, washed with water and dried. Product yield was 92.4 percent by weight.

*Example II*

3,5-dichlorosalicylic acid (120 g.), 65 percent fuming sulfuric acid (150 ml.) and iodine (.0125 weight percent; 0.015 g.) were placed in a 500 ml. 3-necked flask equipped with stirrer, thermometer, chlorine inlet and vent, and the reaction mixture was heated to about 70° C. Chlorine gas was bubbled through the reaction mixture with continuous stirring at a constant rate of about 120 g. per hour. Throughout the two hour reaction time, the temperature was maintained at 70° C. At the conclusion of the reaction time the reaction mixture was poured slowly into 1500 ml. of cold water, filtered, washed with water, and dried. Product yield was 91.8 percent by weight.

Example III 3,5-dichlorosalicylic acid (120 g.), 65 percent fuming sulfuric acid (150 ml.) and iodine (.0250 weight percent; 0.03 g.) were placed in a 500 ml. 3-necked flask equipped with stirrer, thermometer, chlorine inlet and vent, and the reaction mixture was heated to about 70° C. Chlorine gas was bubbled through the reaction mixture with continuous stirring at a constant rate of about 120 g. per hour. Throughout the two hour reaction time, the temperature was maintained at 70° C. At the conclusion of the reaction time the reaction mixture was poured slowly into 1500 ml. of cold water, filtered, washed with water, and dried. Product yield was 91.1 percent by weight.

Example IV 3,5-dichlorosalicylic acid (120 g.), 65 percent fuming sulfuric acid (150 ml.) and iodine (.0500 weight percent; 0.06 g.) were placed in a 500 ml. 3-necked flask equipped with stirrer, thermometer, chlorine inlet and vent, and the reaction mixture was heated to about 70° C. Chlorine gas was bubbled through the reaction mixture with continuous stirring at a constant rate of about 120 g. per hour. Throughout the two hour reaction time, the temperature was maintained at 70° C. At the conclusion of the reaction time the reaction mixture was poured slowly into 1500 ml. of cold water, filtered, washed with water, and dried. Product yield was 90.4 percent by weight.

Example V 3,5-dichlorosalicylic acid (120 g.), 65 percent fuming sulfuric acid (150 ml.) and iodine (.1000 weight percent; 0.12 g.) were placed in a 500 ml. 3-necked flask equipped with stirrer, thermometer, chlorine inlet and vent, and the reaction mixture was heated to about 70° C. Chlorine gas was bubbled through the reaction mixture with continuous stirring at a constant rate of about 120 g. per hour. Throughout the two hour reaction time, the temperature was maintained at 70° C. At the conclusion of the reaction time the reaction mixture was poured slowly into 1500 ml. of cold water, filtered, washed with water and dried. Product yield was 90.0 by weight.

I claim as my invention:

1. A process for the production of 3,5,6-trichlorosalicylic acid by the chlorination of 3,5-dichlorosalicylic acid which comprises contacting chlorine and 3,5-dichlorosalicylic acid in a solution of fuming sulfuric acid containing from about 0.001 to about 1.0 percent by weight of the 3,5-dichlorosalicylic acid of iodine at a temperature between about 40° C. and the boiling point of the reaction mixture for a period of up to 3 hours.

2. A process for the production of 3,5,6-trichlorosalicylic acid which comprises contacting 3,5-dichlorosalicylic acid and gaseous chlorine in the presence of iodine in a quantity of from about 0.001 to about 1.0 percent by weight of 3,5-dichlorosalicylic acid and fuming sulfuric acid at a temperature between about 40° C. and about 100° C. for a period of up to 3 hours.

3. A process for the production of 3,5,6-trichlorosalicylic acid by the chlorination of 3,5-dichlorosalicylic acid with chlorine which comprises conducting the chlorination reaction in the presence of iodine in a quantity of from about 0.005 to about 0.1 percent by weight of the 3,5-dichlorosalicylic acid and fuming sulfuric acid in a minimum quantity of about 4 mols of sulfur trioxide per mol of 3,5-dichlorosalicylic acid at a temperature between about 40° C. and the boiling point of the reaction mixture for a period of up to 3 hours.

4. A process for the production of 3,5,6-trichlorosalicylic acid which comprises heating a solution containing 3,5-dichlorosalicylic acid, iodine in a quantity of from about 0.005 to about 0.1 percent by weight of the 3,5-dichlorosalicylic acid and fuming sulfuric acid in a quantity of between about 4 and 6 moles of sulfur trioxide per mol of 3,5-dichlorosalicylic acid to a temperature between about 40° C. and 100° C. and passing gaseous chlorine therethrough for a period of up to 3 hours.

5. A process for the production of 3,5,6-trichlorosalicylic acid which comprises passing a stream of gaseous chlorine through a body of 3,5-dichlorosalicylic acid in a solution of fuming sulfuric acid containing iodine in a quantity of from about 0.0005 to about 0.1 percent by weight of the 3,5-dichlorosalicylic acid, heated to a temperature of between about 60 and about 80° C. for from about 1 to 3 hours and recovering therefrom 3,5,6-trichlorosalicylic acid.

6. A process for the production of 3,5,6-trichlorosalicylic acid which comprises contacting 3,5-dichlorosalicylic acid and from about 0.5 to 2.0 moles of chlorine per mol of 3,5-dichlorosalicylic acid in the presence of a quantity of iodine from about 0.0005 to about 0.1 percent by weight of the 3,5-dichlorosalicylic acid and fuming sulfuric acid at a temperature between about 40 and 80° C. for a period of up to 3 hours.

7. A process for the production of 3,5,6-trichlorosalicylic acid which comprises passing gaseous chlorine through a liquid body containing 3,5-dichlorosalicylic acid, iodine in a quantity of between about 0.0001 and 0.1 weight percent of the 3,5-dichlorosalicylic acid and fuming sulfuric acid under superatmospheric pressure up to about 200 pounds per square inch, and maintaining the temperature of the reaction mixture between about 40° C. and its boiling point for a period of up to 3 hours.

8. A process for the production of 3,5,6-trichlorosalicylic acid which comprises contacting 3,5-dichlorosalicylic acid with an excess of chlorine in a 65 percent fuming sulfuric acid solution and in the presence of from about 0.0001 to about 0.1 percent by weight of the 3,5-dichlorosalicylic acid of iodine at a temperature between about 60 and 80° C. for from about two to three hours and recovering 3,5,6-trichlorosalicylic acid by water immersion of the reaction mixture.

References Cited in the file of this patent

Farinholt et al.: J. Am. Chem. Soc. 62, 1237–41 (1940). (Copy in Div. 6.)

Datta et al.: J. Am. Chem. Soc., vol. 41, pages 2028–38, 1919.

Adams et al.: Organic Reactions, vol. III, page 167, 1946.

Migrdichian: Organic Synthesis, vol. II, page 1540, 1957.

(Copies of above in Library.)